United States Patent
Hackl et al.

(10) Patent No.: US 10,272,879 B2
(45) Date of Patent: Apr. 30, 2019

(54) WINDSCREEN WIPER SERVICE

(71) Applicant: Robert Bosch GmbH, Stuttgart (DE)

(72) Inventors: Viktor Hackl, Sopron (HU); Peter Deak, Budapest (HU); Michael Weiler, Buehl (DE); Attila Geleta, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 15/036,123

(22) PCT Filed: Oct. 28, 2014

(86) PCT No.: PCT/EP2014/073062
§ 371 (c)(1),
(2) Date: May 12, 2016

(87) PCT Pub. No.: WO2015/071085
PCT Pub. Date: May 21, 2015

(65) Prior Publication Data
US 2016/0272157 A1 Sep. 22, 2016

(30) Foreign Application Priority Data
Nov. 12, 2013 (DE) .......................... 10 2013 222 996

(51) Int. Cl.
*B60S 1/34* (2006.01)
*B60S 1/04* (2006.01)
(Continued)

(52) U.S. Cl.
CPC ........... *B60S 1/3488* (2013.01); *B60S 1/0488* (2013.01); *B60S 1/3459* (2013.01); *B60S 1/40* (2013.01);
(Continued)

(58) Field of Classification Search
CPC .... B60S 1/3436; B60S 1/3459; B60S 1/3443; B60S 1/0488
See application file for complete search history.

(56) References Cited

U.S. PATENT DOCUMENTS

| 4,009,901 | A | * | 3/1977 | Barbee | .................. B60S 1/0466 296/190.1 |
| 5,755,005 | A | * | 5/1998 | Turbessi | ................... B60S 1/34 15/250.34 |
| 6,301,742 | B1 | | 10/2001 | Kota | |
| 2009/0100628 | A1 | | 4/2009 | Wondratschek et al. | |
| 2013/0097799 | A1 | * | 4/2013 | Friscioni | ............... B60S 1/3436 15/250.32 |
| 2013/0133153 | A1 | | 5/2013 | Ku | |

FOREIGN PATENT DOCUMENTS

| DE | 10040530 | 4/2002 |
| DE | 102012201063 | 7/2013 |

(Continued)

OTHER PUBLICATIONS

International Search Report for Application No. PCT/EP2014/073062 dated Jan. 7, 2015 (English Translation, 3 pages).

*Primary Examiner* — Andrew A Horton
(74) *Attorney, Agent, or Firm* — Michael Best & Friedrich LLP

(57) ABSTRACT

The present invention relates to a windscreen wiper device (100) for a vehicle, with a fastening element (50). The windshield wiper device (100) includes a wiper blade (2) with an elongated upper part (10) and an elongated lower part (12) which is at least partially designed to bend. Furthermore, a plurality of connecting elements (18) for connecting the upper part (10) and the lower part (12) is provided, wherein the connecting elements (18) are spaced apart along a longitudinal extension (8) of the wiper blade (2). The connecting elements (18) are designed to enable a movement of the upper part (10) and the lower part (12)

(Continued)

relative to one another with a movement component along a longitudinal extension (8) of the wiper blade (2). Furthermore, the wiper blade (2) comprises a wiper blade-side fastening part (20). The wiper blade fastening element (20) comprises a securing element (22) into which the fastening element (50) is insertable and which is designed to engage the fastening element (50) to force-fit or form-fit.

15 Claims, 5 Drawing Sheets

(51) Int. Cl.
    *B60S 1/40*        (2006.01)
    *B60S 1/38*        (2006.01)

(52) U.S. Cl.
    CPC ............ *B60S 1/3436* (2013.01); *B60S 1/3443* (2013.01); *B60S 1/3801* (2013.01)

(56) References Cited

FOREIGN PATENT DOCUMENTS

| | | |
|---|---|---|
| FR | 2886250 | 12/2006 |
| GB | 1425568 | 2/1976 |
| JP | S5868858 A | 4/1983 |
| JP | S59172661 U | 11/1984 |
| JP | H0333709 U | 4/1991 |
| JP | 2010513104 A | 4/2010 |
| WO | 2011131245 | 10/2011 |
| WO | 2014072186 A1 | 5/2014 |

\* cited by examiner

WINDSCREEN WIPER SERVICE

BACKGROUND OF THE INVENTION

The invention relates to a windshield wiper device for a vehicle, in particular a motor vehicle.

Windshield wiper devices typically have a wiper arm or wiper lever, wherein a wiper blade is moved over the windshield of a motor vehicle. The wiper blade is moved here between a first turning position and a second turning position. For this purpose, the wiper arm is connected via a driveshaft to a wiper motor. In particular in the case of windshields having pronounced changes in curvature, the wiper blade easily loses contact with the windshield. In particular in the case of windshields with a pronounced curvature, this may result in wiping areas not being wiped, or in smearing.

Since a wiping operation has to be optimized for a multiplicity of parameters, such as, for example, the amount of rain falling on the windshield, a possible snow loading on the windshield, the speed of the vehicle and associated wind pressure on the wiper arm, smearing cannot be reliably prevented in a simple manner by adaptation of the pressure of the wiper arm on the windshield. There is therefore a need for further improvement of windshield wiper devices.

A plurality of boundary conditions should additionally be taken into consideration for improvement purposes. These include the outlay on the production, and the production costs, the material costs, but also the properties of the windshield wiper device, in particular the function under diverse conditions and the endurance under a multiplicity of conditions.

Customarily, the regular use of windshield wiper devices, in particular wiper blades, causes the occurrence of wear phenomena, which are associated with a deterioration in the wiping quality. Furthermore, the exposed position of windshield wiper devices on the front windshield or rear windshield of motor vehicles, in particular during passage through a washing system, gives rise to the risk of the windshield wiper device being damaged or even torn off. In these cases, the worn or damaged windshield wiper devices have to be exchanged. Conventionally, the exchange of windshield wiper devices is relatively complicated since the latter are customarily fastened to the driveshaft via screw connections.

SUMMARY OF THE INVENTION

It is the object of the present invention to provide a windshield wiper device with which at least one or more of the abovementioned disadvantages are reduced or substantially do not occur.

According to an aspect of the present invention, a windshield wiper device for a vehicle with a fastening element, in particular a motor vehicle, is proposed. The windshield wiper device comprises a wiper blade with an elongate upper part and an elongate lower part, which are configured to be at least partially bendable. Furthermore, a plurality of connecting elements for connecting the upper part and the lower part are provided, wherein the connecting elements are spaced apart from one another along a longitudinal extent of the wiper blade. The connecting elements are designed in order to permit a movement of the upper part and of the lower part relative to each other with a movement component along a longitudinal extent of the wiper blade. Furthermore, the wiper blade comprises a wiper-blade-side fastening part. The wiper-blade-side fastening part has a securing element into which the fastening element can be inserted and which is designed in order to form a non-positively locking connection and/or positively locking connection with the fastening element.

According to a further aspect of the present invention, a method for mounting a windshield wiper device is provided. The method comprises providing a windshield wiper device according to the embodiments described herein. Furthermore, the method comprises fastening the wiper-blade-side fastening part to the fastening element by forming the non-positively locking connection and/or positively locking connection between the securing element and the fastening element.

Preferred embodiments and particular aspects of the invention emerge from the dependent claims, the drawings and the description here.

According to the windshield wiper device described herein in accordance with embodiments described herein and by the method for mounting the windshield wiper device, a windshield wiper device which can be mounted and dismounted in a simple manner is provided. The windshield wiper device, which is preferably of the fin-ray type, is mounted onto a fastening element, which may be a drive spindle for the wiper, and dismounted therefrom with a single movement ("one click"). Accordingly, in the event of damage, the windshield wiper device can be exchanged in a simple manner or removed in a simple manner before passage through a washing system and subsequently mounted again.

According to embodiments of the disclosure that may be combined with other embodiments described herein, the securing element has an opening into which the fastening element can be inserted. Therefore, the wiper blade can be fastened on the mounting element by a single movement, namely the insertion of the securing element into the opening for a non-positively locking connection and/or positively locking connection.

According to embodiments of the disclosure that may be combined with other embodiments described herein, the size of the opening is variable. The windshield wiper device can therefore be used in combination with different types of fastening elements.

According to embodiments of the disclosure that may be combined with other embodiments described herein, circumferential regions of the opening are designed in order to form the non-positively locking connection and/or positively locking connection with the fastening element. A non-positively locking connection and/or positively locking connection between the securing element and the fastening element can therefore be produced and released again in a simple manner, for example by the size of the opening being changed.

According to embodiments of the disclosure that may be combined with other embodiments described herein, the wiper-blade-side fastening part has an actuating device which is designed in order to release the non-positively locking connection and/or positively locking connection. The wiper blade can therefore be dismounted in a simple manner.

According to embodiments of the disclosure that may be combined with other embodiments described herein, the actuating device is designed in order to change the size of the opening upon an actuation. The wiper blade can therefore be mounted and dismounted in a simple manner.

According to embodiments of the disclosure that may be combined with other embodiments described herein, the securing element is of U-shaped design. The windshield wiper device can therefore be produced simply and cost-effectively.

According to embodiments of the disclosure that may be combined with other embodiments described herein, the actuating device is insertable between two open ends of the U-shaped securing element. The non-positively locking connection and/or positively locking connection can therefore be released in a simple manner.

According to embodiments of the disclosure that may be combined with other embodiments described herein, the securing element comprises a retaining spring. The windshield wiper device can therefore be produced simply and cost-effectively.

According to embodiments of the disclosure that may be combined with other embodiments described herein, the securing element is designed in order to engage in a depression of the fastening element in order to form the non-positively locking connection and/or positively locking connection. A windshield wiper device with which a position of the wiper-blade-side fastening part can be secured in a stable manner relative to the mounting element is therefore provided.

BRIEF DESCRIPTION OF THE DRAWINGS

Exemplary embodiments of the invention are illustrated in the figures and are described in more detail below. In the figures.

DETAILED DESCRIPTION

The same reference signs are used below for identical elements and elements of identical function, unless stated otherwise.

Figure 1:
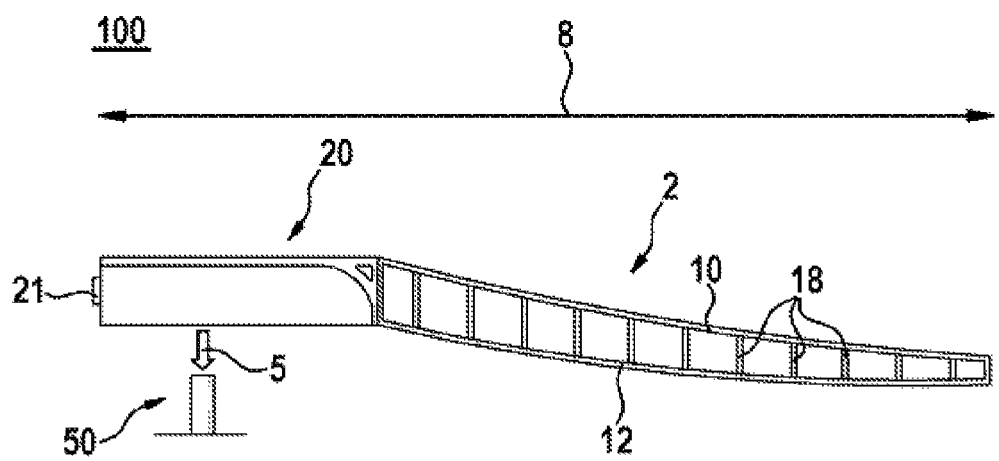
FIG. 1 shows a schematic illustration of a windshield wiper device according to embodiments of the disclosure in an unfastened state.
Figure 2:
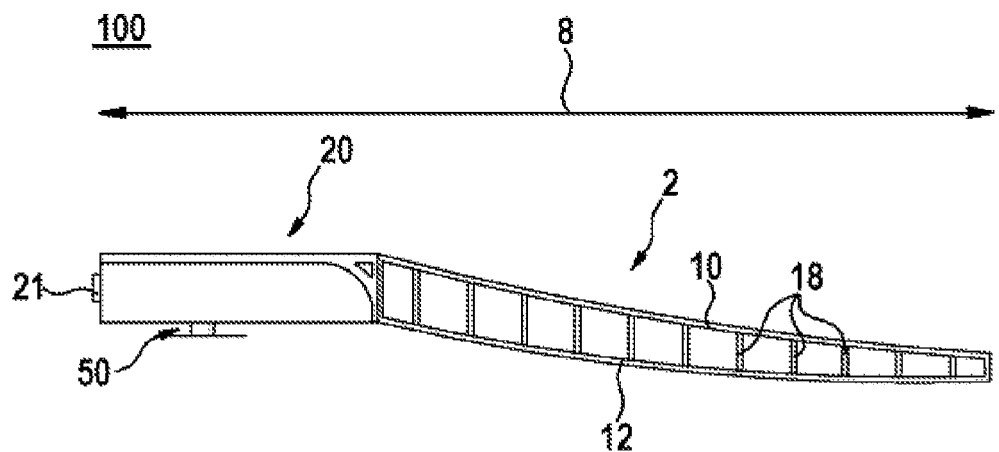
FIG. 2 shows a schematic illustration of the windshield wiper device of FIG. 1 according to embodiments of the disclosure in a fastened state.

A windshield wiper device 100 according to embodiments of the disclosure is illustrated schematically in FIGS. 1 and 2. FIG. 1 shows the windshield wiper device 100 in an unfastened state, and FIG. 2 shows the windshield wiper device 100 of FIG. 1 in a fastened state.

According to embodiments of the disclosure, the windshield wiper device 100 comprises a fin-ray structure and a wiper-blade-side fastening part 20 with a securing element.

According to embodiments of the disclosure, the windshield wiper device 100 comprises a wiper blade 2 with an elongate upper part 10 and an elongate lower part 12, which are configured to be at least partially bendable. Furthermore, a plurality of connecting elements 18 for connecting the upper part 10 and the lower part 12 are provided, wherein the connecting elements 18 are spaced apart from one another along a longitudinal extent 8 of the windshield wiper device 100. The connecting elements 18 are designed in order to permit a movement of the upper part 10 and of the lower part 12 relative to each other with a movement component along a longitudinal extent 8 of the windshield wiper device 100.

According to embodiments of the disclosure that may be combined with other embodiments, the wiper blade 2 has a wiper-blade-side fastening part 20. The wiper-blade-side fastening part 20 has a securing element into which the fastening element 50 of the vehicle can be inserted. The securing element is designed in order to form a non-positively locking connection and/or positively locking connection with the fastening element 50.

According to embodiments of the disclosure that may be combined with other embodiments, a "non-positively locking connection" is understood as meaning all connections which arise through the transmission of forces (for example non-positive connections, frictional connection). In particular, such connections use compressive forces and/or frictional forces. These connections are held together by the acting force.

According to embodiments of the disclosure that may be combined with other embodiments, a "positively locking connection" is understood as meaning all connections which arise by intermeshing of at least two elements (positive connections). In particular, by means of the mechanical connection, the elements also cannot be released without force transmission or if the force transmission is interrupted.

As is illustrated by way of example in FIGS. 1 and 2, the wiper-blade-side fastening part 20 according to embodiments of the windshield wiper device 100 that may be combined with other embodiments can be connected to a fastening element 50 or can be fastened thereto. For this purpose, the fastening element 50 is inserted into the securing element of the wiper-blade-side fastening element 50, as indicated by the arrow 5 in FIG. 1. According to typical embodiments, the securing element is present in the wiper-blade-side fastening element 50 or is integrated therein.

The securing element forms a non-positively locking connection and/or positively locking connection with the fastening element 50 in order to fixedly connect the wiper-blade-side fastening part 20 to the fastening element 50 on the vehicle. A windshield wiper device 100 with which a position of the wiper-blade-side fastening part 20 can be secured in a stable manner relative to the fastening element 50 is therefore provided.

According to embodiments of the disclosure that may be combined with other embodiments, the securing element has an opening into which the fastening element 50 can be inserted. According to typical embodiments, the size of the opening is variable or can be varied. For example, the size of the opening can be varied by an actuating device 21 ("release button"). According to embodiments of the disclosure, circumferential regions of the opening are designed in order to form the non-positively locking connection and/or positively locking connection with the fastening element 50. A non-positively locking connection and/or positively locking connection between the securing element and the fastening element 50 can therefore be produced and released again in a simple manner, for example by the size of the opening being changed.

According to embodiments of the disclosure that may be combined with other embodiments, the wiper-blade-side fastening part 20 furthermore has the actuating device 21 which is designed in order to release the non-positively locking connection and/or positively locking connection. According to typical embodiments, the actuating device 21 has a key button or a pushbutton. A user, by pressing the actuating device 21, can thus release the non-positively locking connection and/or positively locking connection in order to dismount the windshield wiper device 100 and remove same from the fastening part 50. Accordingly, the windshield wiper device 100 can easily be exchanged in the event of damage or removed before passage through a washing system and subsequently mounted again in a simple manner.

According to some embodiments, a pushbutton can be provided as actuating device 21 on one side, for example, as illustrated in FIG. 1, on the rear side or else on the upper side of the windshield wiper device, i.e. on the side facing away from the windshield. According to another alternative, two pushbuttons can also be provided as actuating device 21, for example on both sides of the fastening part 20.

According to embodiments of the disclosure that may be combined with other embodiments, the actuating device 21 is furthermore designed in order to permit mounting of the windshield wiper device 100 on the fastening element 50. For example, by actuation of the actuating device 21, the securing element can be opened or released such that the fastening element 50 can be inserted. In particular, the insertion can take place during actuation of the actuating device 21. After the insertion, the actuation of the actuating device 21 can be ended or released (for example by letting go of the key button or pushbutton), as a result of which the non-positively locking connection and/or positively locking connection is produced. Accordingly, the windshield wiper device 100 can easily be exchanged in the event of damage or can be removed before passage through a washing system and subsequently mounted again in a simple manner.

Figure 3:
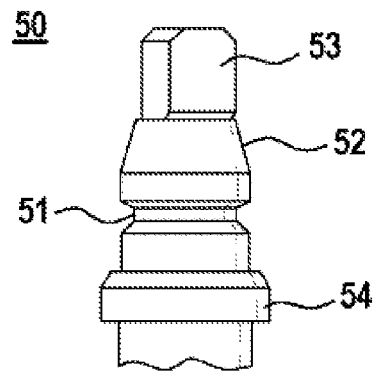
FIG. 3 shows a perspective view of the fastening element according to embodiments of the disclosure.

FIG. 3 shows a perspective view of the fastening element 50 on the vehicle according to embodiments of the disclosure.

According to embodiments of the disclosure that may be combined with other embodiments, the fastening element 50 is designed as a drive spindle or driveshaft for the windshield wiper device 100.

As is shown by way of example in FIG. 3, the fastening element 50 has a depression or an indentation 51. According to typical embodiments, the securing element of the windshield wiper device 100 is designed in order to engage in the depression or indentation 51 of the fastening element in order to form the non-positively locking connection and/or positively locking connection.

The illustrative fastening element 50 shown in FIG. 3 furthermore has a conical region 52. According to typical embodiments, the conical region is formed above the depression 51 in order to facilitate insertion of the fastening element into the securing element of the windshield wiper device 100.

According to embodiments of the disclosure that may be combined with other embodiments, the fastening element 50 is designed as an intersection for transmitting torque to the wiper arm (reference sign 53), for the axial securing by the retaining spring (depression 51), and/or for the axial guidance with the wiper arm (reference sign 54).

According to embodiments of the disclosure that may be combined with other embodiments, the securing element 22, for example the retaining spring, is fitted or cast fixedly into the wiper blade or into the wiper-blade-side fastening part 20. The wiper is pushed axially onto the bearing shaft. According to typical embodiments, a translatory movement therefore takes place for the fastening. For example, during the pushing onto the spindle, the spring gives way and latches into the depression (intersection) 51. The transmission of torque is ensured by the intersection 53. According to typical embodiments, the intersection 54 restricts a radial freedom of movement/a radial play.

Figure 4A:
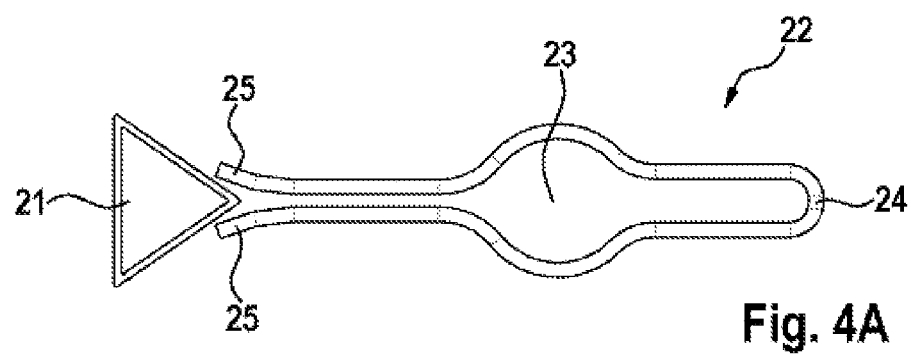
FIGS. 4A and 4B show perspective views of a securing element according to embodiments of the disclosure.
Figure 4B:
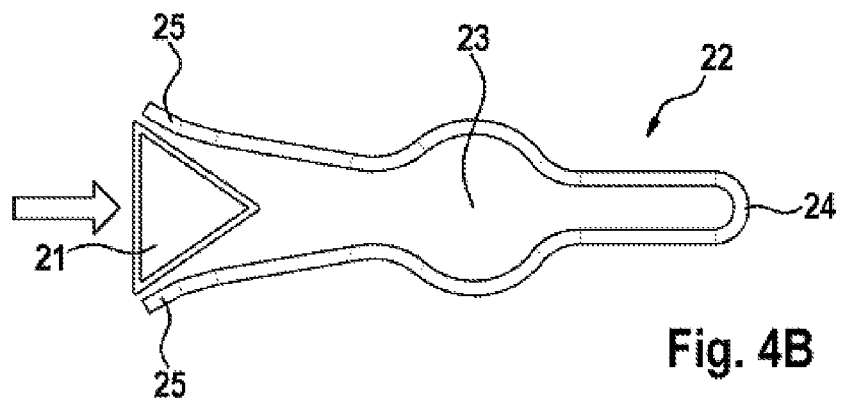

FIGS. 4A and 4B show perspective views of a securing element 22 according to embodiments of the disclosure.

According to embodiments of the disclosure that may be combined with other embodiments, the securing element 22 has the opening 23 into which the fastening element 50 can be inserted. According to typical embodiments, the size of the opening 23 is variable or can be varied.

The illustrative securing element 22 shown in FIG. 4A is of U-shaped design. The U shaped securing element 22 here has a closed end 24 and two open ends 25. In a region between the closed end 24 and the open ends 25, a distance between the two limbs of the U shape changes such that the opening 23 is formed. According to typical embodiments, the opening 23 is of circular or oval design. In particular, the two limbs of the U shaped securing element 22 are shaped in such a manner that the opening 23 is of circular or oval design.

According to embodiments of the disclosure that may be combined with other embodiments, the actuating device 21 can be inserted between the two open ends of the U shaped securing element 22, as is shown by way of example in FIG. 4B. According to typical embodiments, the open ends 25 can be of funnel-shaped design in order to permit insertion or engagement of the actuating device 21.

As is shown by way of example in FIG. 4B, the U shape of the securing element 22 can be widened by the actuating device 21, and therefore the size of the opening 23 can be varied. In particular, the opening can be widened by the actuating device 21 in order to insert the fastening element 50 into the opening 23. According to typical embodiments, after the insertion, the actuation can be released again in order to produce the non-positively locking connection and/or positively locking connection between the securing element 22 and the fastening element 50.

According to embodiments of the disclosure that may be combined with other embodiments, the securing element 22 is designed as a retaining spring. The securing element 22 can therefore be produced in a simple and cost-effective manner.

As is shown in FIG. 3, the fastening element 50 can have a depression or an indentation 51. According to typical embodiments, the securing element 22 is designed in order to engage in the depression 51 of the fastening element 50 in order to form the non-positively locking connection and/or positively locking connection. With reference to FIGS. 4A and 4B, circumferential regions of the opening 23 can be designed in order to form the non-positively locking connection and/or positively locking connection with the fastening element 50. Typically, the circumferential regions of the opening 23 are designed in order to engage in the depression 51 of the fastening element 50 in order to form the non-positively locking connection and/or positively locking connection. A non-positively locking connection and/or positively locking connection between the securing element 22 and the fastening element 50 can therefore be produced and released again in a simple manner, for example by the size of the opening 23 being changed.

According to typical embodiments, a diameter of the opening 23 in the non-mounted state of the windshield wiper device 100 can be smaller than a maximum diameter of the conical region 52 (lower end of the conical region 52 in FIG. 3) of the fastening element 50, and can be larger than a minimum diameter of the conical region 52 (upper end of the conical region 52 in FIG. 3).

According to typical embodiments, during the mounting of the windshield wiper device 100 the conical region 52 of the fastening element 50 can thus be inserted into the opening 23, as a result of which the opening is widened as the insertion progresses. When the lower end of the conical region 52 is reached, the circumferential regions of the opening move by the restoring (spring) force provided by the U shape into the depression 51 or engage in the latter such that the securing element 22 forms in particular a positively locking connection with the fastening element 50. The restoring spring force of the securing element 22 can furthermore provide a non-positively locking connection. A non-positively locking connection and/or positively locking connection between the securing element 22 and the fastening element 50 can therefore be produced in a simple manner.

According to embodiments of the disclosure that may be combined with other embodiments, the securing element 22, for example the retaining spring, is fitted or cast fixedly into the wiper blade or the wiper-blade-side fastening part 20. The wiper is pushed axially onto the bearing shaft, with the spring giving way and latching into the depression (intersection) 15. The transmission of torque is ensured by the intersection 53 (see FIG. 3). According to typical embodiments, the intersection 54 restricts a radial freedom of movement/a radial play.

Figure 5:
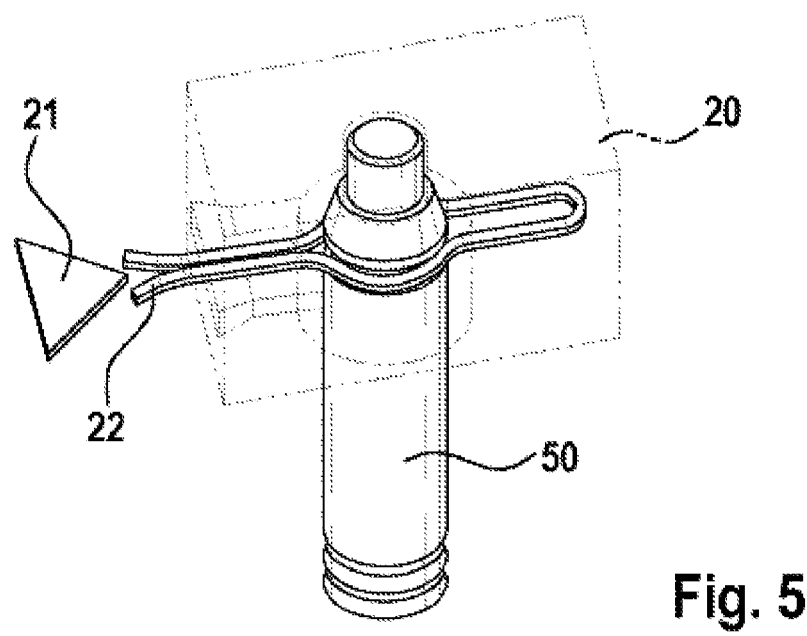
FIG. 5 shows a schematic illustration of the windshield wiper device mounted on the fastening element according to embodiments of the disclosure.

FIG. 5 shows a schematic illustration of the windshield wiper device 100 mounted on the fastening element 50 according to embodiments of the disclosure.

As is shown in FIG. 5, the wiper-blade-side fastening part 20 is placed onto the fastening element 50 which may be a driveshaft. The securing element 22 engages in the depression of the fastening element 50 in order to produce at least a positively locking connection with the fastening element 50. The actuating device 50 is provided on the wiper-blade-side fastening part 20 in order to release the non-positively locking connection and/or positively locking connection of the securing element 22 with the fastening element 50.

The embodiments described herein thus provide a windshield wiper device which can be mounted and dismounted in a simple manner. Accordingly, the windshield wiper device can easily be exchanged in the event of damage or removed before passage through a washing system and subsequently mounted again in a simple manner.

Illustrative embodiments of wiper systems for which the windshield wiper device described herein can be advantageously used are described below. In principle, however, the fastening device described herein may also be used for other windshield wiper devices.

Figure 6:
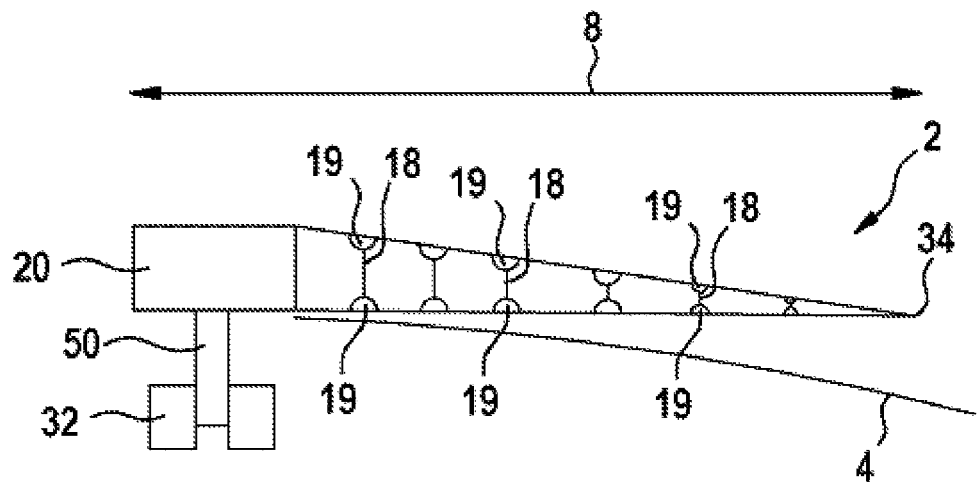
FIG. 6 shows a schematic illustration of a further exemplary embodiment of a windshield wiper device according to the invention in the form of a wiper arm with integrated wiper blade in a basic position.
Figure 7:
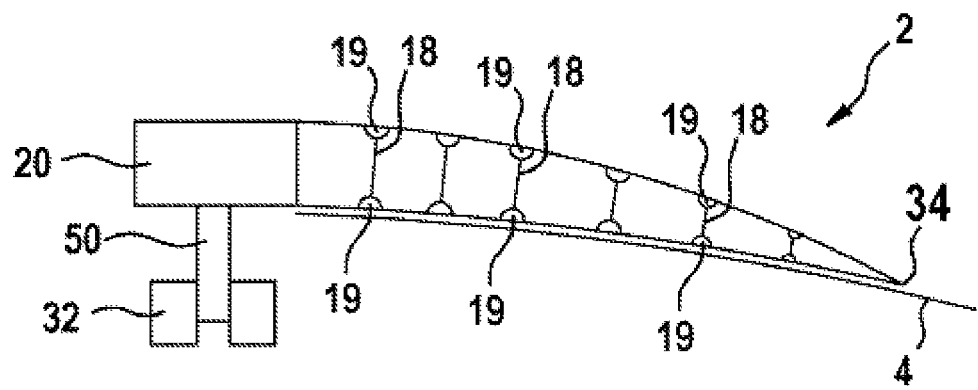
FIG. 7 shows a schematic illustration of the wiper arm with integrated wiper blade according to FIG. 6 in a position placed against a windshield.

FIGS. 6 and 7 show schematic illustrations of a wiper blade 2 in a basic position (FIG. 6) and in a position placed against a windshield 4 (FIG. 7) according to embodiments of the windshield wiper device 100 of the disclosure. The wiper blade 2 serves for wiping a windshield 4 of a vehicle, which is, for example, a motor vehicle, in particular a car. The wiper blade 2 is customarily attached to a windshield wiper arm which is driven for wiping purposes by means of a motor. For this purpose, the wiper blade 2 has a holder at which it can be fastened to the windshield wiper arm. In FIG. 6, the wiper blade 2 is in a basic position in which it is at least partially lifted off the windshield 4. The wiper blade 2 has a longitudinal extent 8 and has an elongate upper part 10 and a likewise elongate lower part 12. The longitudinal extents of the upper part 10 and of the lower part 12 substantially correspond to the longitudinal extent 8 of the wiper blade 2.

Both the upper part 10 and the lower part 12 are bendable beams or may be configured as bendable beams which, in FIGS. 6 and 7, are for example in each case formed in one piece. This makes it possible to realize a particularly stable construction. It is likewise possible for in each case only one part of the upper part 10 and/or the lower part 12 to be configured to be bendable. Furthermore, it is alternatively possible for the upper part 10 to be configured in multiple parts.

According to some embodiments that may be combined with the other embodiments described here, a material that has a modulus of elasticity in a range between 0.005 kN/mm$^2$ and 0.5 kN/mm$^2$, in particular 0.01 kN/mm$^2$ and 0.1 kN/mm$^2$, is used for the upper part 10 and/or the lower part 12. This makes it possible to realize suitable bendability of the upper part 10 and of the lower part 12. Together with a suitably configured cross-sectional area of the upper part 10 and of the lower part 12, optimum flexural rigidity is thus attained. The upper part 10 and the lower part 12 are arranged so as to be situated opposite each other. One end of the upper part 10 is fixedly connected at an outer connecting position 34 to one end of the lower part 12. The upper part 10 and the lower part 12 are otherwise spaced apart from each other.

The upper part 10 and the lower part 12 are connected to each other by connecting elements 18. In particular in the basic position of the wiper blade 2, said connecting elements run approximately transversely with respect to the longitudinal extent 8 of the wiper blade 2. The connecting elements 18 are fastened by means of rotary joints 19 to mutually facing inner longitudinal sides of the upper part 10 and of the lower part 12. The rotary joints 19 are hinges here. In particular, the rotary joints 19 may be in the form of film hinges. This is advantageous in particular if upper part 10, lower part 12 and/or connecting elements 18 are produced from a plastics material or are coated with a suitable plastics material.

According to typical embodiments described here that may be combined with other embodiments described here, a rotary joint is selected from the group consisting of: a hinge, a film hinge, a narrowing of the material for the purpose of generating reduced rigidity along a torsional axis, a joint with an axis of rotation, a means for connecting the upper part to the connecting element or for connecting the lower part to the connecting element, which means permits the displacement of the lower part in relation to the upper part along the longitudinal extent, etc.

Embodiments in which the joint is provided by a film hinge thus constitute a very simple means for providing the joints for a fin-ray wiper. The wiper blade 2 may be provided in one piece, in particular in ready-from-the-mold form. According to typical embodiments, the windshield wiper device, in particular the wiper blade, is produced from one or more materials from a group consisting of: TPE (thermoplastic elastomer), for example TPE S, TPE O, TPE U, TPE A, TPE V and TPE E. The film hinges can exhibit high ductility. This may be realized for example by means of a material selected from the group PP, PE, POM and PA. Alternatively, the film hinges may be produced from one or more materials from a group consisting of: TPE (thermoplastic elastomer), for example TPE S, TPE O, TPE U, TPE A, TPE V and TPE E.

The connecting elements 18 are spaced apart from one another along the longitudinal extent of the wiper blade 2. The spacings between two respective adjacent connecting elements 18 are uniform. Said spacings may, however, also be selected so as to differ. The spacings are advantageously less than 50 mm, in particular less than 30 mm. In this way, it is possible to ensure particularly great flexibility of the windshield wiper device, in particular of its lower part, and good adaptation to the curvature and changes in curvature of the windshield to be wiped.

In particular in the basic position of the wiper blade 2, the connecting elements 18 are fastened to the lower part 12 such that the longitudinal axes of said connecting elements run at angles 26 of between 65° and 115°, in particular between 75° and 105°, with respect to the lower part 12. The angles particularly advantageously lie between 80° and 100°. This advantageously ensures particularly good transmission of a force, which acts on the lower part, to the upper part. Furthermore, a particularly stable windshield wiper device can be realized in this manner. Corresponding statements apply to the points at which the connecting elements 18 are fastened to the upper part 10.

The spacings between the upper part 10 and the lower part 12 are defined primarily by the lengths of the connecting elements 18. The lengths of the connecting elements 18 increase from the outer connecting position as far as approximately the locations at which the wiper-blade-side fastening part 20 begins. In this way, in the side view of the wiper blade 2 as per FIG. 6, the upper part 10 and the lower part 12 form a wedge. The connecting elements 18 are designed to be resistant to buckling.

FIG. 7 shows a schematic illustration of the wiper blade 2 as per FIG. 6 in a position in which said wiper blade is placed against the windshield 4. Since the windshield 4 has a curvature, contact pressure forces are exerted on the lower part 12 when the wiper blade 2 is placed against the windshield 4. Since the upper part 10 and the lower part 12 are bendable beams and the connecting elements 12 are mounted rotatably on upper part 10 and lower part 12, the upper part 10 and the lower part 12 are displaceable relative to each other. Owing to the compressive forces acting on the lower part 12 from below, the wiper blade 2 bends in the direction from which the compressive forces originate, and is placed precisely against the curvature of the windshield 4.

Owing to the construction of the embodiments described here, when a force is exerted on the lower part (by the windshield 4), the lower part bends in the direction from which the force acts. This is the case owing to the connection of the upper part 10 and of the lower part at connecting positions 14 and/or 16, the shape, and owing to rotary joints at the connection between the connecting elements and the upper and lower parts respectively.

In the illustration as per FIG. 7, there is a small spacing between the wiper blade 2 and the windshield 4, which small spacing serves here merely for the illustration of the windshield 4 and of the wiper blade 2 and, in reality, is substantially not present when the wiper blade 2 is placed against the windshield 4. Furthermore, a wiper lip which is placed onto the windshield 4 for wiping purposes is typically located on the lower side, which faces away from the upper part 10, of the lower part 12. For reasons of clarity, the wiper lip is not illustrated in FIGS. 6 and 7.

A windshield wiper device according to embodiments described here uses the effect of tail fins of certain fish, which under the action of lateral pressure do not deflect in the direction of pressure but instead arch in the opposite direction, that is to say in the direction from which the pressure originates. This principle is also referred to as the "fin-ray" principle. In this way, a windshield wiper device according to the embodiments described herein has the advantage of improved adaptation to a windshield of a motor vehicle. In the case of a conventional windshield wiper blade, the upper part thereof is normally rigid, that is to say is not of bendable design.

FIGS. 6 and 7 show a wiper blade 2 with a longitudinal extent 8. The windshield wiper device has only one connecting position 34. Such an arrangement is frequently used for rear windshield wipers. However, the disclosure is not restricted to rear windshield wipers, and the windshield wiper device according to the embodiments described here may also be used for front windshield wipers. Optional refinements and details described in the individual embodiments may generally be used for both variants of an arrangement of a windshield wiper device.

FIGS. 6 and 7 furthermore show the wiper-blade-side fastening part 20 to which the wiper blade 2 is attached. The wiper-blade-side fastening part 20 is connected to a wiper motor 32 which drives the wiper-blade-side fastening part 20 for the purpose of wiping the windshield 4. The fastening part 30 may be configured according to the embodiments of the present disclosure. Furthermore, the wiper motor 32 may be connected to the fastening element 50.

The wiper blade 2 is configured in a wedge-shaped manner, with one end of the upper part 10 being fixedly connected at an outer connecting position 34 to one end of the lower part 12. The respective other end of the upper part 10 and of the lower part 12 are fastened to the wiper-blade-side fastening part 20.

In FIG. 6, the wiper blade 2 is illustrated in its position in which it is not placed against the windshield, such that the lower part 12 is of substantially rectilinear design. According to yet further embodiments that may be combined with other embodiments, the lower part in the unloaded state is of convex design, that is to say has a curvature that projects away from the upper part in a central region. The windshield wiper device according to the embodiments described here may then typically, upon making contact with a windshield and proceeding from the convex shape of the lower part, adopt the corresponding concave shape of the lower part that adapts to the windshield.

Figure 8:
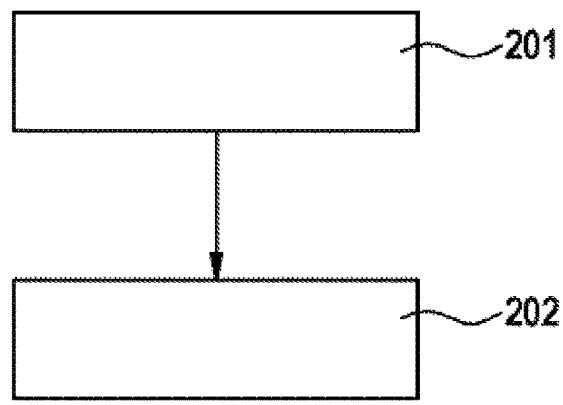
FIG. 8 shows a sequence diagram for illustrating embodiments of the method for mounting a windshield wiper device according to embodiments of the disclosure.

In order to illustrate embodiments of the method 200 for mounting a windshield wiper device 100, a sequence diagram is illustrated in FIG. 8. According to embodiments of the method 200, the method 200 comprises providing 201 a windshield wiper device according to the embodiments described herein. Furthermore, the method comprises fastening 202 the wiper-blade-side fastening part to the fastening element by forming the non-positively locking connection and/or positively locking connection between the securing element and the fastening element.

The embodiments described herein of the windshield wiper device and the method for mounting the windshield wiper device therefore provide a windshield wiper device which can be mounted and dismounted in a simple manner. Accordingly, the windshield wiper device can easily be exchanged in the event of damage or can be removed before passage through a washing system and subsequently mounted again in a simple manner.

What is claimed is:

1. A windshield wiper device (100) for a vehicle with a fastening element (50), the device comprising a wiper blade (2) with
    an elongate upper part (10), which is configured to be at least partially bendable,
    an elongate lower part (12), which is configured to be at least partially bendable,
    a plurality of connecting elements (18) connecting the upper part (10) and the lower part (12), wherein the connecting elements (18) are spaced apart from one another along a longitudinal extent (8) of the wiper blade (2), and wherein the connecting elements (18) are configured to permit a movement of the upper part (10) and the lower part relative to each other with a movement component along the longitudinal extent (8), and
    a wiper-blade-side fastening part (20), wherein the wiper-blade-side fastening part (20) has a generally U-shaped securing element (22) in the form of a retaining spring which is configured to receive the fastening element (50) and which is configured to form a non-positively locking connection and/or positively locking connection with the fastening element (50), wherein the generally U-shaped securing element (22) has a closed end (24) and two arms defining an opposite, open end, wherein the wiper-blade-side fastening part (200) has an actuating device (21) which is configured to release the non-positively locking connection and/or positively locking connection, wherein the actuating device (21) is positioned at the open end and is configured to move generally parallel to the two arms in a direction toward the closed end (24) when activated to spread and separate the two arms.

2. The windshield wiper device (100) as claimed in claim 1, wherein the securing element (22) has an opening (23) configured to have the fastening element (50) inserted therein.

3. The windshield wiper device (100) as claimed in claim 2, wherein the size of the opening (23) is variable.

4. The windshield wiper device (100) as claimed in claim 3, wherein circumferential, circular-shaped regions of the opening (23) are configured to form the non-positively locking connection and/or positively locking connection with the fastening element (5).

5. The windshield wiper device (100) as claimed in claim 4, wherein the wiper-blade-side fastening part (20) has an actuating device (21) which is configured to release the non-positively locking connection and/or positively locking connection.

6. The windshield wiper device (100) as claimed in claim 5, wherein the actuating device (21) is configured to change the size of the opening (23) upon an actuation.

7. The windshield wiper device (100) as claimed in claim 6, wherein the securing element (22) is configured to engage in a depression (51) of the fastening element (50) in order to form the non-positively locking connection and/or positively locking connection.

8. The windshield wiper device (100) as claimed in claim 2, wherein circumferential, circular-shaped regions of the opening (23) are configured to form the non-positively locking connection and/or positively locking connection with the fastening element (5).

9. The windshield wiper device (100) as claimed in claim 2, wherein the actuating device (21) is configured to change the size of the opening (23) upon an actuation.

10. The windshield wiper device (100) as claimed in claim 1, wherein the wiper-blade-side fastening part (20) has an actuating device (21) which is configured to release the non-positively locking connection and/or positively locking connection.

11. The windshield wiper device (100) as claimed in claim 1, wherein the securing element (22) is configured to engage in a depression (51) of the fastening element (50) in order to form the non-positively locking connection and/or positively locking connection.

12. A method (200) for mounting a windshield wiper device, comprising:
    providing (201) the windshield wiper device (100) as claimed in claim 1, and
    fastening (202) the wiper-blade-side fastening part (20) to the fastening element (50) by forming the non-positively locking connection and/or positively locking connection between the securing element (22) and the fastening element (50).

13. The windshield wiper device (100) as claimed in claim 1, wherein the securing element (22) is configured such that when the securing element (22) is locked to the fastening element (50), the securing element (22) is held against longitudinal movement in a longitudinal direction of the fastening element (50).

14. The windshield wiper device (100) as claimed in claim 1, wherein the securing element (22) is configured such that when the securing element (22) is locked to the fastening element (50), a positive locking connection to the fastening element (50) is formed.

15. The windshield wiper device (100) as claimed in claim 1, further comprising the fastening element (50), wherein the fastening element (50) includes an intersection (53) that facilitates a transmission of torque from the fastening element (50) to the wiper blade (2).

* * * * *